UNITED STATES PATENT OFFICE.

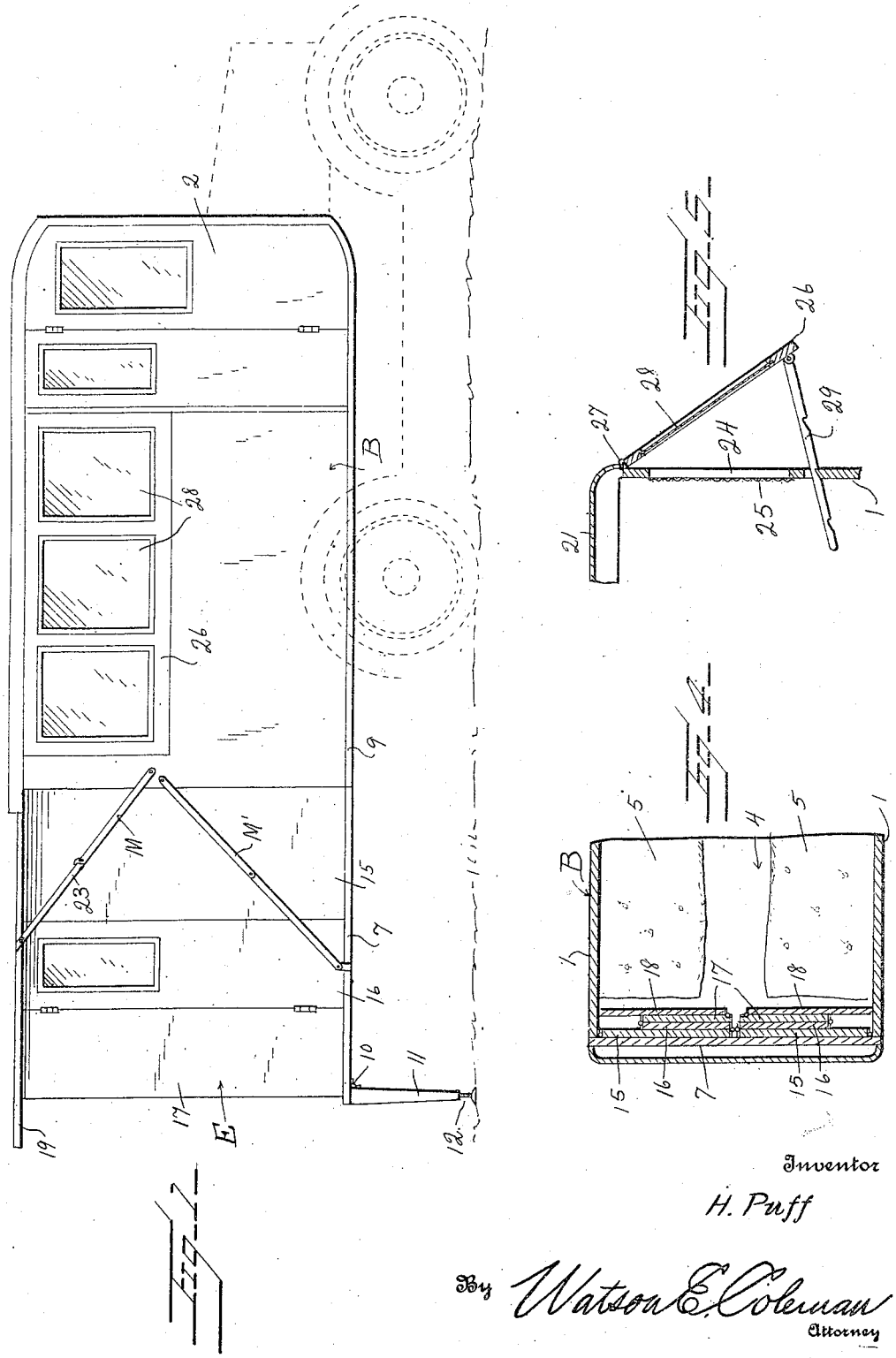

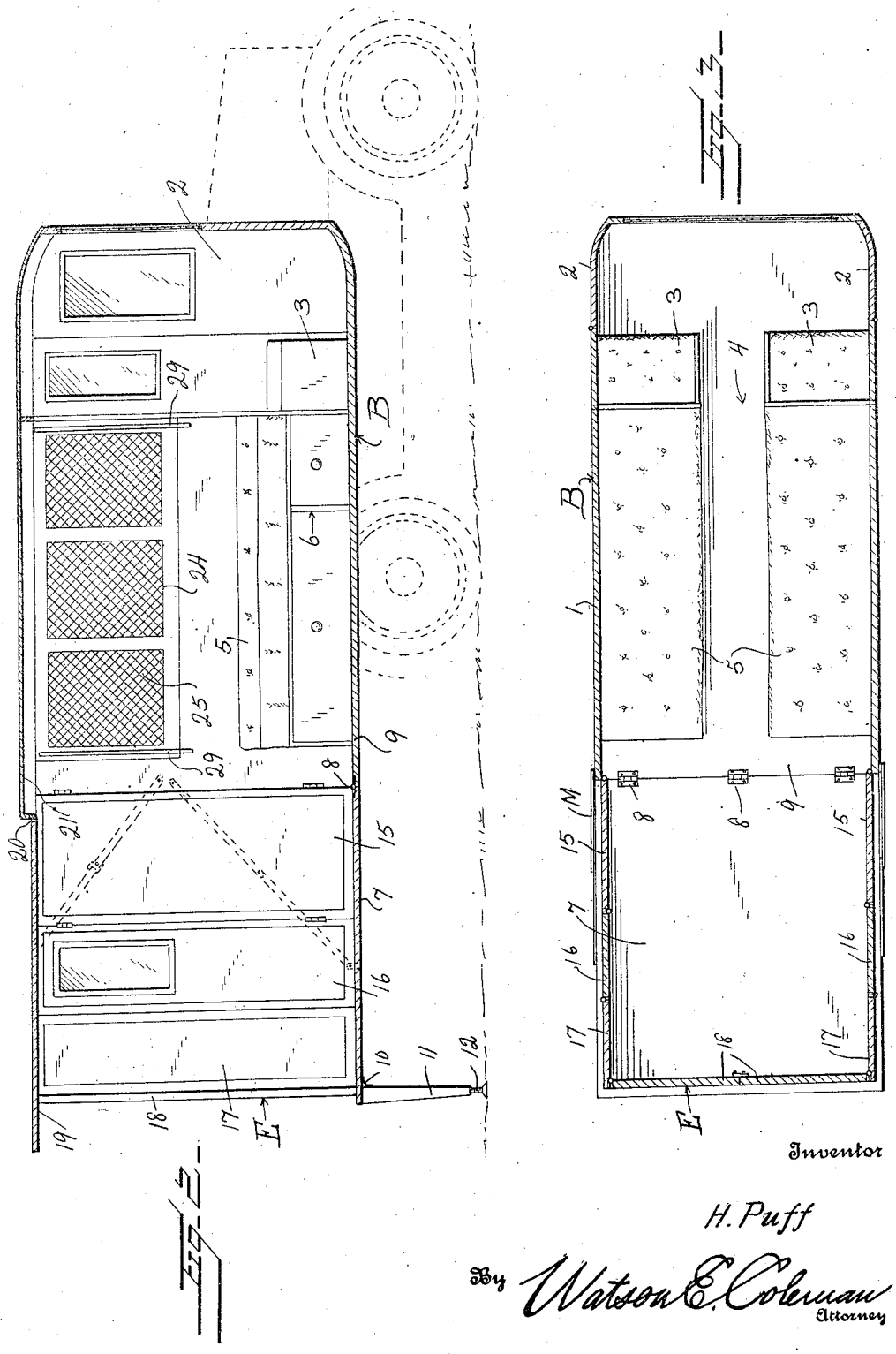

HENRY PUFF, OF ST. CLOUD, MINNESOTA.

VEHICLE-BODY.

1,305,162.	Specification of Letters Patent.	Patented May 27, 1919.

Application filed September 23, 1918. Serial No. 255,356.

*To all whom it may concern:*

Be it known that I, HENRY PUFF, citizen of the United States, residing at St. Cloud, in the county of Stearns and State of Minnesota, have invented certain new and useful Improvements in Vehicle-Bodies, of which the following is a specification, reference being had to the accompanying drawings.

This invention relates to certain improvements in bodies for vehicles and has relation more particularly to a device of this general character especially designed and adapted for use in connection with motor driven vehicles and it is an object of the invention to provide a body of this type having novel and improved means whereby it may be employed with convenience and facility for household purposes.

It is also an object of the invention to provide a body of a novel and improved construction wherein an end portion thereof may be extended or enlarged when the vehicle of which the body forms a part is not in transit.

Another object of the invention is to provide a novel and improved body wherein the rear thereof is provided with a plurality of relatively movable panels which may be extended and assembled to enlarge the body and which may be readily and conveniently folded to occupy a minimum of space and to close the rear end of the body proper.

The invention consists in the details of construction and in the combination and arrangement of the several parts of my improved vehicle body whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a vehicle body constructed in accordance with an embodiment of my invention, the extension of the body being in operative assemblage;

Fig. 2 is a longitudinal, vertical, sectional view taken through my improved wagon body as illustrated in Fig. 1;

Fig. 3 is a horizontal, longitudinal, sectional view taken through the body as disclosed in Fig. 2;

Fig. 4 is a fragmentary, longitudinal, horizontal, sectional view taken through the rear portion of the body with the extension folded;

Fig. 5 is a fragmentary, transverse, sectional view taken through the body and showing one of the panels coacting with the window openings in the body in a raised position.

As disclosed in the accompanying drawings, B denotes my improved body in its entirety and which, in the present embodiment of my invention, forms a part of a motor driven vehicle. The body B is of an inclosed type and each of the side walls 1 adjacent the forward end of the body is provided with a door 2 through which entry within or exit from the body may be had. Within the body B at each side thereof is a transversely disposed seat structure 3 positioned rearwardly of but in close proximity to a door 2. The inner ends of the seats 3 are spaced apart to afford an entrance 4 whereby access may be had to the rear portion of the body B.

Arranged within the body B adjacent each side wall 1 and extending longitudinally thereof is a bed structure 5 and the space below each of the bed structures 5 is divided into a plurality of compartments 6 in which desired articles or commodities may be stored. It is preferred that each of the compartments 6 include a removable drawer.

E denotes an extension in its entirety and which extension comprises a plurality of relatively movable panels which, when in folded relation, serve to close the rear end of the body B.

The bottom platform or panel 7 of the extension is hingedly connected, as at 8, with the rear end portion of the bottom or floor 9, of the body B and said panel or platform is adapted to swing upwardly into substantially a vertical position. Hingedly connected, as at 10 to each of the outer corners of the panel or platform 7 is a supporting leg 11 which, when the panel or platform 7 is lowered, drops by gravity and properly engages the ground or other surface upon which the vehicle may rest for maintaining said panel or platform 7 in substantially a horizontal position. The outer or free end portion of each of the legs 11 has adjustably engaged therewith a leveling foot 12 in order to compensate for any irregularities or unevenness of the surface with which the device coacts.

Hingedly connected with each side wall 14 of the body B at the rear thereof is a side panel 15. Hingedly connected to the panel 15 is a second panel 16 and hingedly connected to the panel 16 is a further panel 17. The panel 17 has hingedly connected thereto a panel 18, which, when the panels are properly extended over the bottom panel or platform 7, serves as a rear panel and is preferably of a size to completely close, in conjunction with a panel 18 of the second series of side panels, the rear of the extension.

19 denotes a top panel or roof hingedly connected as at 20 to the top or roof 21 of the body B and capable of swinging movement in a vertical plane. The top panel or roof 20 is of such size as to close the rear end of the body B when the panels of the extension E are in folded relation.

In practice the panels 15, to 18, inclusive, are first folded back into the rear portion of the body B, the bottom or platform 7 is then swung upwardly and after which the top panel or roof is lowered or dropped. Any suitable means may be employed for locking the panels in this folded relation.

Interposed between the top panel or roof 20 and the side walls 1 of the body B are the supporting or bracing members M. Each of the members M consists of two pivotally connected rods or levers 23, the outer end portion of one of said rods or levers 23 being pivotally connected with the top panel or roof 20 and the similar portion of the second lever being pivotally engaged with a side wall 1. When the top panel or roof is lowered or in a closed position the connection between the rods or levers 23 will break upwardly so that when it is desired to raise the roof or top panel 20 it is only necessary to force the pivoted end portions of the rods or levers 23 downwardly.

Interposed between the bottom panel or platform 7 and the side walls 1 of the body B are the supporting or bracing members M' of a character similar to the members M and which serve to support the panel or platform 7 when substantially in its horizontal position and also prevent the same from having accidental upward movement.

Each of the side walls 1 is provided with a series of window openings 24 over each of which is disposed a screen element 25. 26 denotes a panel extending along the openings 24 and hingedly connected as at 27, to the side wall 1 and movable in a vertical plane. The panel 26 is provided with the transparent windows 28 adapted to register with the openings 24 when the panel 26 is in its lowered position.

Coacting with the panel 26 and the adjacent side walls 1 is a supporting member 29 whereby the panel 26 may be held at different angles as the occasions of practice may necessitate.

From the foregoing description, it is thought to be obvious that a vehicle body constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a vehicle body, a bottom panel hinged to the bottom of the body at an end thereof and movable vertically, a top panel hingedly connected to the top of the body and also movable vertically and two series of hingedly connected panels having relative movement horizontally, a panel of each series being hingedly connected to a side wall of the body, said panels when extended forming side and rear walls interposed between the bottom panel and the top panel, and brace members interposed between the top and bottom panels and the body, said brace members each consisting of two pivotally connected levers, certain of the levers of both brace members being pivotally connected to the body, one of the levers of one brace member being connected to the bottom panel, the corresponding lever of the other brace member being pivotally connected to the top panel, each brace member adapted to function as a support, and a supporting leg for the bottom panel.

2. The combination with a dominant vehicle body having a rear open end, of an auxiliary collapsible body extension for the rear end of the dominant body, said auxiliary collapsible body extension comprising top and bottom panels respectively having hinged connections to the upper and lower edges of the rear open end of the said dominant body, foldable reinforcing devices for supporting said panels raised or lowered on their hinged connections, side panels respectively having hinged connections with side edges of the rear open end of the dominant body, said side panels comprising a plurality of hingedly connected foldable sections, said sections when unfolded being interposed between the upper and lower panels assisting in supporting the same, and when folded adapted to extend into the rear open end of the vehicle body, whereby the upper and lower panels may cover them, the upper panel being foldable against the lower panel.

In testimony whereof I hereunto affix my signature in the presence of two witnesses.

HENRY PUFF.

Witnesses:
PETER BRICK,
JOHN M. EMMEL.